United States Patent
Zielinski et al.

(10) Patent No.: US 8,258,702 B2
(45) Date of Patent: Sep. 4, 2012

(54) AMBIENT LED LIGHTING SYSTEM AND METHOD

(75) Inventors: Mark Andre Zielinski, Bloomfield Hills, MI (US); Karl William Wojcik, Sterling Heights, MI (US); Robert Andrew Miller, Plymouth, MI (US); James Martin Lawlis, Grosse Pointe Farms, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 419 days.

(21) Appl. No.: 12/469,768

(22) Filed: May 21, 2009

(65) Prior Publication Data
US 2009/0289579 A1 Nov. 26, 2009

Related U.S. Application Data

(60) Provisional application No. 61/054,967, filed on May 21, 2008.

(51) Int. Cl.
*B60Q 1/14* (2006.01)

(52) U.S. Cl. ............ 315/77; 315/76; 315/291; 315/294; 315/297; 307/10.8

(58) Field of Classification Search .................. 315/77, 315/291, 294, 307, 76, 297; 307/10.8
See application file for complete search history.

(56) References Cited

U.S. PATENT DOCUMENTS

| | | | |
|---|---|---|---|
| 4,295,079 A | 10/1981 | Otsuka et al. | |
| 4,396,868 A | 8/1983 | Watanabe et al. | |
| 6,016,038 A | 1/2000 | Mueller et al. | |
| 6,548,967 B1 | 4/2003 | Dowling et al. | |
| 6,786,625 B2 | 9/2004 | Wesson | |
| 6,965,205 B2 | 11/2005 | Piepgras et al. | |
| 7,124,003 B1 | 10/2006 | West et al. | |
| 7,262,752 B2 | 8/2007 | Weindorf | |
| 7,471,051 B1 * | 12/2008 | Wacknov et al. | 315/291 |
| 2002/0145394 A1 | 10/2002 | Morgan et al. | |
| 2003/0057886 A1 | 3/2003 | Lys et al. | |
| 2004/0095081 A1 * | 5/2004 | Kernahan | 315/307 |
| 2005/0248299 A1 | 11/2005 | Chemel et al. | |
| 2005/0285547 A1 | 12/2005 | Piepgras et al. | |
| 2006/0226795 A1 | 10/2006 | Walter et al. | |
| 2007/0019415 A1 | 1/2007 | Leblanc et al. | |
| 2007/0145915 A1 | 6/2007 | Roberge et al. | |
| 2007/0153514 A1 | 7/2007 | Dowling et al. | |
| 2007/0159750 A1 * | 7/2007 | Peker et al. | 361/93.1 |
| 2007/0291483 A1 * | 12/2007 | Lys | 362/227 |
| 2009/0102396 A1 * | 4/2009 | Petrucci et al. | 315/294 |

* cited by examiner

*Primary Examiner* — Thuy Vinh Tran
*Assistant Examiner* — Jonathan Cooper
(74) *Attorney, Agent, or Firm* — Brooks Kushman P.C.; Frank MacKenzie

(57) ABSTRACT

In at least one embodiment, an ambient lighting system comprising a lighting module and a controller is provided. The lighting module is configured to drive a light emitting device (LED) arrangement to display a desired ambient color in response to a lighting control signal and to transmit a lighting status signal providing diagnostic information for one of the lighting module and the LED arrangement. The controller is configured to transmit the lighting control signal including first digital data indicative of the desired ambient color and a feed signal for powering the lighting module on a bi-directional data communication bus between the controller and the lighting module. The controller is further configured to receive the lighting status signal on the bi-directional data communication bus.

15 Claims, 4 Drawing Sheets

AMBIENT LED LIGHTING SYSTEM AND METHOD

CROSS-REFERENCE TO RELATED APPLICATION

This application claims the benefit of U.S. provisional application Ser. No. 61/054,967 filed on May 21, 2008, which is hereby incorporated by reference in its entirety.

BACKGROUND

1. Technical Field

One or more embodiments of the present invention generally relate to ambient light emitting diode (LED) system in a vehicle.

2. Background Art

Conventional automotive ambiance lighting systems include a central controller that is electrically coupled to a plurality of LED lighting modules. The LED lighting modules may be positioned in various zones of the vehicle. Such zones may correspond to various interior and/or exterior positions of the vehicle. Each LED lighting module usually includes three or four different colored LEDs. Such colored LEDs include red, green, and blue (RGB). In some cases, white colored LEDs may be implemented along with the RGB LEDs.

The central controller includes a plurality of output drivers for driving the colored LEDs. The output drivers may generate pulse width modulated (PWM) signals and drive the colored LEDs at different PWM duty cycles to create different colors and intensities. For example, the central controller may drive the red, green, and blue LEDs with the same PWM duty cycle to produce white light. In yet another example, a purple color may be achieved by driving each of the red and blue LEDs at different PWM duty cycles. As noted above, some LED configurations may include a dedicated white colored LED as opposed to driving the red, green and blue colored LED arrangements at equal duty cycles to generate the color white. Current automotive ambient lighting systems generally couple a single wire between each output driver that is positioned in the central controller and each colored LED positioned in a lighting module. A ground or return circuit is generally coupled between the central controller and all of the LED lighting modules positioned in a particular zone of the vehicle. As such, each LED lighting module may be connected to the central controller via 4 or 5 circuits. The cost of the system is primarily dominated by the cost of the electrical wires (e.g., cut leads) and any such wire splices needed to electrical couple the cut leads. Efforts at reducing electrical wires and wire splices needed to electrically couple the cut leads are gaining more attention by vehicle manufacturers to reduce overall cost.

SUMMARY

In at least one embodiment, an ambient lighting system comprising a lighting module and a controller is provided. The lighting module is configured to drive a light emitting device (LED) arrangement to display a desired ambient color in response to a lighting control signal and to transmit a lighting status signal providing diagnostic information for one of the lighting module and the LED arrangement. The controller is configured to transmit the lighting control signal including first digital data indicative of the desired ambient color and a feed signal for powering the lighting module on a bi-directional data communication bus between the controller and the lighting module. The controller is further configured to receive the lighting status signal on the bi-directional data communication bus.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

The embodiments of the present invention as set forth in one or more of the figures generally illustrate and describe a plurality of controllers (or modules), or other such electrically based components for use in a ambient LED lighting system of a vehicle. All references to the various controllers and electrically based components and the functionality provided for each, are not intended to be limited to encompassing only what is illustrated and described herein. While particular labels may be assigned to the various controllers and/or electrical components disclosed, such labels are not intended to limit the scope of operation for the controllers and/or the electrical components. The controllers and/or modules may be combined with each other and/or separated in any manner based on the particular type of electrical architecture that is desired or intended to be implemented in the vehicle. It is generally recognized that all controllers and/or modules disclosed herein may include, but not limited to, any number of microprocessors, ASICs, ICs, memory devices (e.g., FLASH, ROM, RAM, EPROM and/or EEPROM), and software which co-act with one another to perform the various functions set below.

Figure 1:
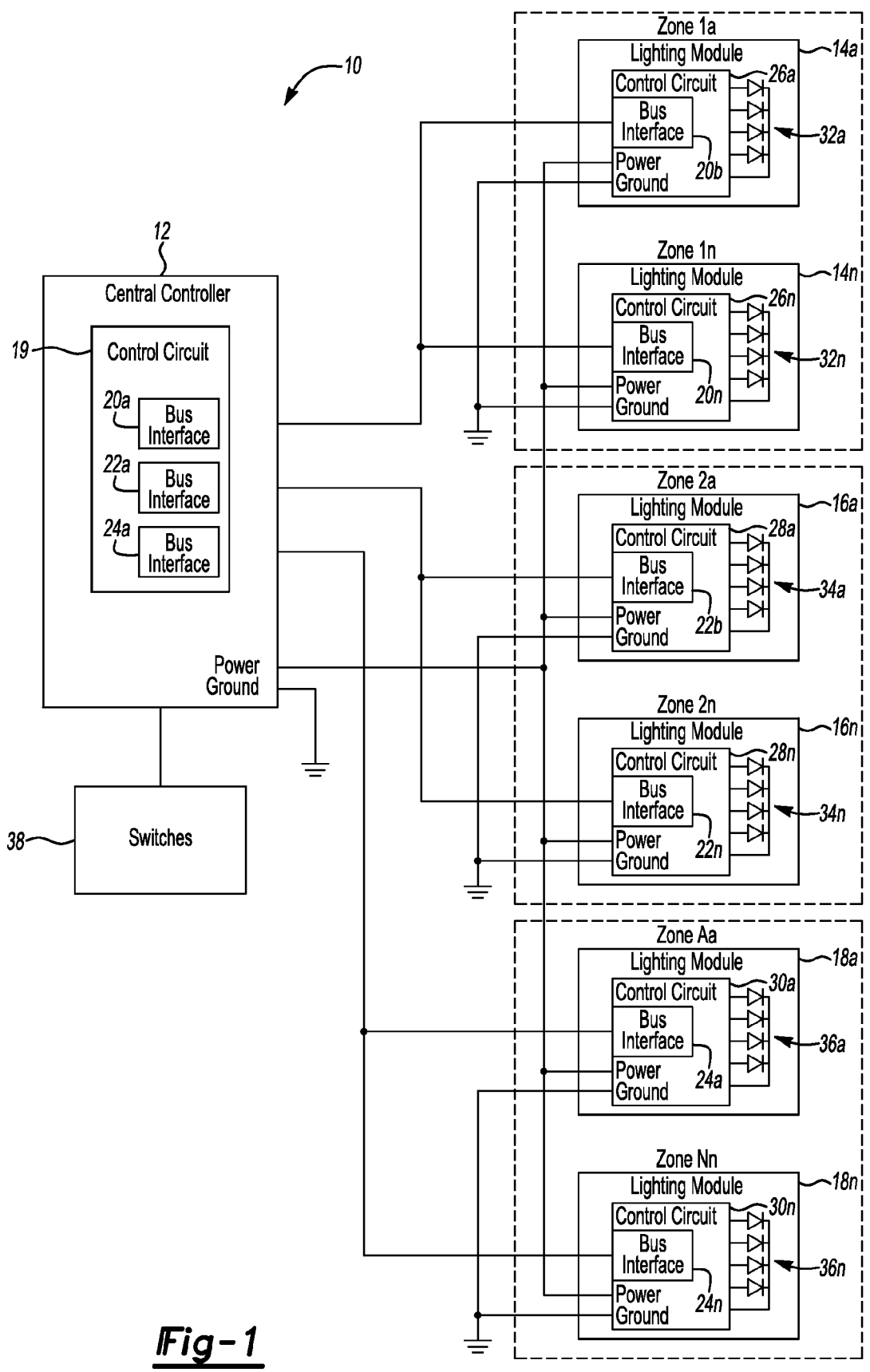
FIG. 1 depicts an ambient lighting system of a vehicle.

Referring now to FIG. 1, an ambient lighting system 10 of a vehicle is shown. The system 10 includes a central controller 12 and a plurality of lighting modules 14a-14n, 16a-16n, and 18a-18n. The lighting modules 14a-14n, 16a-16n, and 18a-18n are positioned about various zones 1a-1n, 2a-2n, and Aa-Nn in the vehicle. One or more of the zones 1a-1n, 2a-2n, and Aa-Nn may be positioned within interior or about exterior portions of the vehicle. Such zones may correspond to a center console, an instrument panel, and/or an interior section of a vehicle door. The zones may include any section of the vehicle on which ambient lighting is capable of being positioned on. The lighting modules 14a-14n may be positioned in zones 1a-1n, the lighting modules 16a-16n may be positioned in zones 2a-2n, and the lighting modules 18a-18n may be positioned in zones Aa-Nn. The central controller 12 includes a control circuit 19. The control circuit 19 includes a plurality of bus interfaces 20a, 22a, and 24a. The control circuit 19 may include a microcontroller, Application Specific Integrated Circuit (ASIC), or other such circuit recognized to control a function or feature electronically. The bus interface 20a, 22a and 24a may be positioned within the control circuit 19 or exterior to the control circuit 19.

The lighting modules 14a-14n, 16a-16n, and 18a-18n include a control circuit 26a-26n, 28a-28n, and 30a-30n, respectively. The control circuits 26a-26n, 28a-28n, and 30a-30n include a bus interface 20b-20n, 22b-22n, and 24b-24n, respectively. In general, the bus interfaces may facilitate bi-directional data communication with a single wire between the central controller 12 and the lighting modules 14a-14n, 16a-16n, and 18a-18n via a local interconnect network (LIN) or other such single wire or multi-wire data communication bus generally situated to facilitate data communication between controllers and/or modules in a vehicle. The particular type of data communication bus implemented may vary based on the desired criteria of a particular implementation. The bus interface 20a is electrically coupled to the interfaces 20b and 20n to facilitate data communication between the central controller 12 and the lighting modules 14a-14n in zones 1a-1n. In a similar manner, the bus interface 22a is electrically coupled to the interfaces 22b-22n to facilitate data communication between the central controller 12 and the lighting modules 16a-16n in zones 2a-2n. Likewise, the bus interface 24a is electrically coupled to the interfaces 24b-24n to facilitate data communication between the central controller 12 and the lighting modules 18a-18n in zones Aa-Nn.

The lighting modules 14a-14n, 16a-16n, and 18a-18n include LED arrangements 32a-32n, 34a-34n, and 36a-36n, respectively. The LED arrangements 32a-32n, 34a-34n, and 36a-36n may include either three or four LED arrangements. As noted above, red, blue, and green LED arrangements may be controlled to provide the white color, or a dedicated white color LED may be added to provide the color white.

The central controller 12 may provide a power connection (e.g., POWER) for the lighting modules 14a-14n, 16a-16n, and 18a-18n located in the zones 1a-1n, 2a-2n, and Aa-Nn, respectively. It is generally contemplated that the central controller 12 may include power conditioning circuitry (not shown) for conditioning the power generated therefrom. Switches 38 may be positioned on an instrument panel in the vehicle or other suitable area in the vehicle for electrically communicating with the central controller 12 to allow occupants in the vehicle to select a desired ambient lighting color and intensity.

In operation, an occupant may select a desired color and intensity via the switches 38. The switches 38 transmit a light control signal to the central controller 12 which is generally indicative of the desired color and intensity for any particular zone 1a-1n, 2a-2n, and Aa-Nn. The switches 38 may be implemented as a hardwired based analog or digital switch or as a field that is selectable via a display device which transmits digital data over a communication bus to the central controller 12. In the event, the switch 38 is coupled to another controller in the vehicle (e.g., not to the central controller 12), the controller may transmit the desired light and intensity from the switch 38 over the communication bus to the central controller 12. The control circuit 19 generates and transmits lighting control signals over any one or more of the bus interfaces 20a, 22a, and 24a that is indicative of the desired color and intensity selected by the occupant to one or more of the bus interfaces 20b, 20n, 22b, 22n, 24b, and 24n. The lighting control signals are in the form of time coded digital data. The control circuit 19 may include up to three current drivers (not shown) that are each operably coupled to the bus interfaces 20a, 22a, and 24a for generating and transmitting the time coded digital data. The lighting control signals generally correspond to the desired color and intensity selected by the occupant for a particular zone 1a-1n, 2a-2n, and Aa-Nn and are transmitted from any one or more of the bus interfaces 20a, 22a, and 24a.

The bus interfaces 20b-20n; 22b-22n; and/or 24b-24n receives the lighting control signals whereby the control circuits 26a-26n; 28a-28n; and/or 30a-30n decode the lighting control signals and drive the LED arrangements 32a, 32n; 34a-34n; and 36a-36n via pulse width modulated (PWM) or controlled current based signals to achieve the desired color and intensity.

Figure 2:
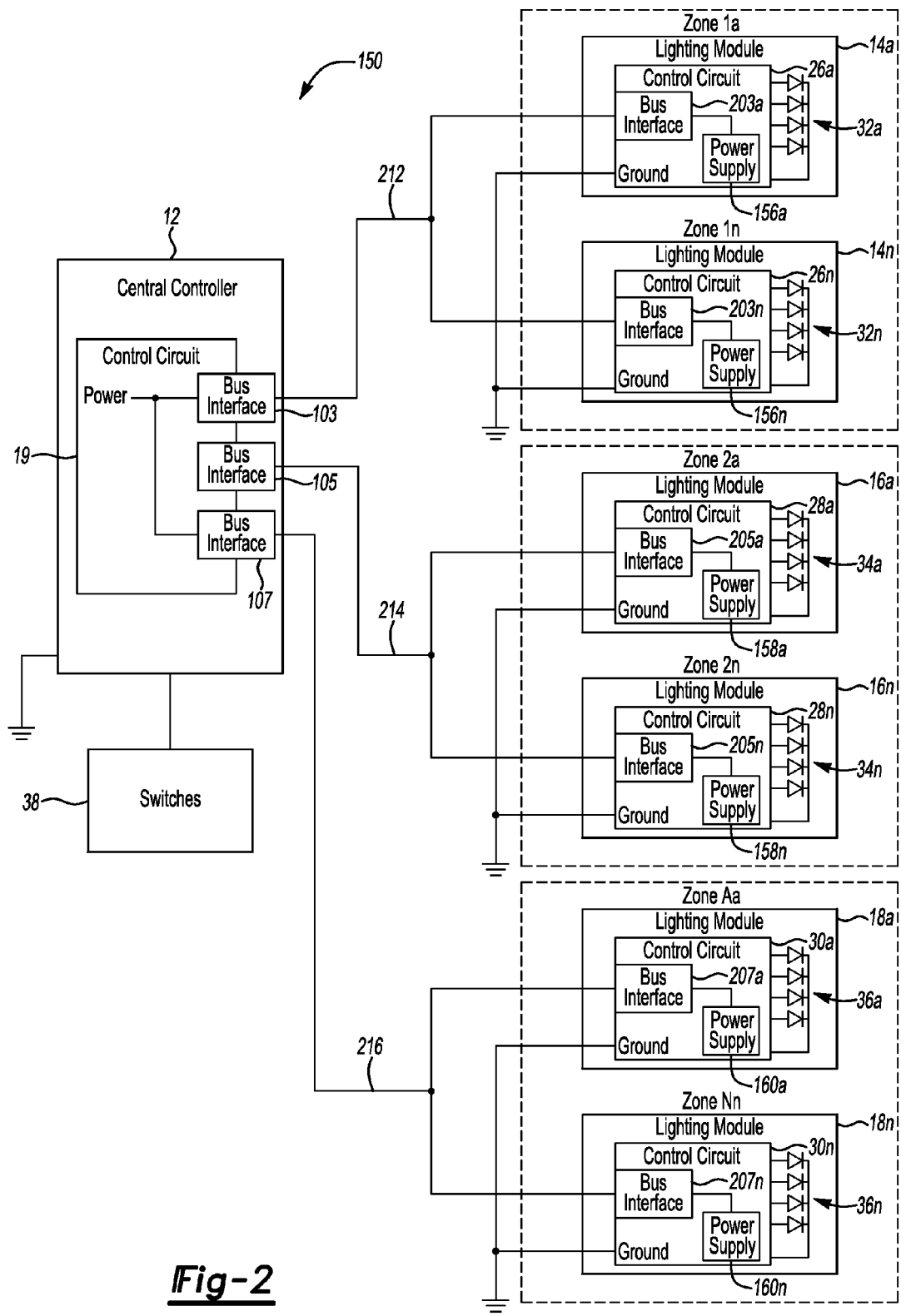
FIG. 2 depicts an ambient lighting system in accordance to one embodiment of the present invention.

Referring now to FIG. 2, an ambient lighting system 150 in accordance with one embodiment of the present invention is shown. The central controller 12 generally includes a plurality of bus interfaces 103, 105, 107. The bus interfaces 103, 105, 107 differ from the bus interfaces 20a, 22a, 24a as shown in connection with the system 10. For example, the lighting control signal as discussed in connection with system 10 comprise digital data in the form of a low voltage signal that is transmitted to the lighting modules 14a-14n, 16a-16n, and 18a-18n. In contrast, the bus interfaces 103, 105, 107 receive a constant or varying high voltage signal (or feed signal) from a power supply (not shown) within the control circuit 19. A wave generator (not shown) transposes digital data onto the high voltage signals so that the control circuit 19 generates the lighting control signals. In such a case, the lighting control signals generated by the bus interfaces 103, 105, 107, respectively, each include the high voltage signal and digital data. As shown, the bus interface 103 is electrically coupled to the lighting modules 14a-14n via a first single wire data communication bus 212; the bus interface 105 is electrically coupled to the lighting modules 16a-16n via a second single wire data communication bus 214; and the bus interface 107 is electrically coupled to the lighting modules 18a-18n via a third single wire data communication bus 216. The bus interfaces 103, 105, 107 transmit the lighting control signals to the lighting modules 14a-14n, 16a-16n, and 18a-18n, respectively, on the single wire data communication buses 212, 214, and 216, respectively, whereby the digital data is decoded to obtain the desired color and intensity and the high voltage signal is used to power the lighting modules 14a-14n, 16a-16n, and 18a-18n. The system 150 as illustrated may eliminate the need for a dedicated power connection from the central controller 12 to the lighting modules 14a-14n, 16a-16n, and 18a-18n (e.g., see FIG. 1, each lighting module 14a-14n, 16a-16n, and 18a-18n requires a dedicated power connection). By transposing digital data onto the high voltage signal, such a condition generally reduces the number of cut leads needed to provide an ambient lighting system.

The control circuits 26a-26n, 28a-28n and 30a-30n may include bus interfaces 203a-203n, 205a-205n and 207a-207n, respectively. The bus interfaces 203a-203n, 205a-205n, and 207a-207n receive the lighting control signals from the bus interfaces 103, 105, 107, respectively. The control circuits 26a-26n, 28a-28n and 30a-30n may include power supplies 156a-156n, 158a-158n and 160a-160n. The bus interfaces 203a-203n, 205a-205n and 207a-207n provide the power feed that is transposed on the lighting control signals to the power supplies 156a-156n, 158a-158n and 160a-160n, respectively. While transposing high voltage on the lighting control signal may facilitate the removal of cut leads, such a condition may cause electromagnetic interference (EMI) from the communication bus wires 212, 214, and 216. In general, the high voltage signal may be between 5 and 16 volts. Each single wire data communication bus 212, 214, and 216 is generally adapted to operate between 5 and 16 volts.

Figure 3:
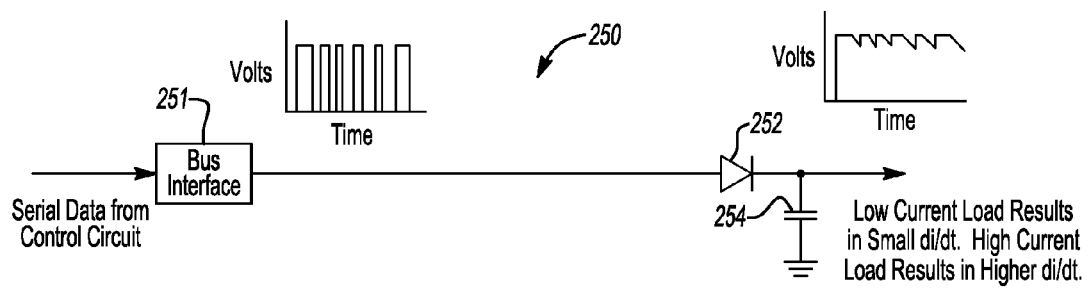
FIG. 3 depicts a circuit that may exhibit electromagnetic interference (EMI)

FIG. 3 provides a circuit 250 which illustrates the manner in which EMI may be created by transposing digital data on the high voltage signal. The circuit 250 generally includes a bus interface 251, a diode 252, and a capacitor 254. The diode 252 is operably coupled to the bus interface 251. The capacitor 254 is operably coupled to the diode 252 and is charged while data is being transmitted on the bus (e.g., single wire communication bus).

The voltage across the capacitor 254 is used to power the lighting modules 14a-14n, 16a-16n, and 18a-18n. In the event the low voltage digital data is transposed on the constant high voltage signal on the lighting control signal as noted with the system 150, such a signal passes through the diode 252 whereby a larger di/dt can be generated through the communication bus between the bus interface 251 and the diode 252 due to the large amount of voltage amplitude variation that is present across the capacitor 254. The large di/dt through the communication bus may yield electromagnetic interference which may interfere with the operation of other vehicle electronic systems.

Figure 4:
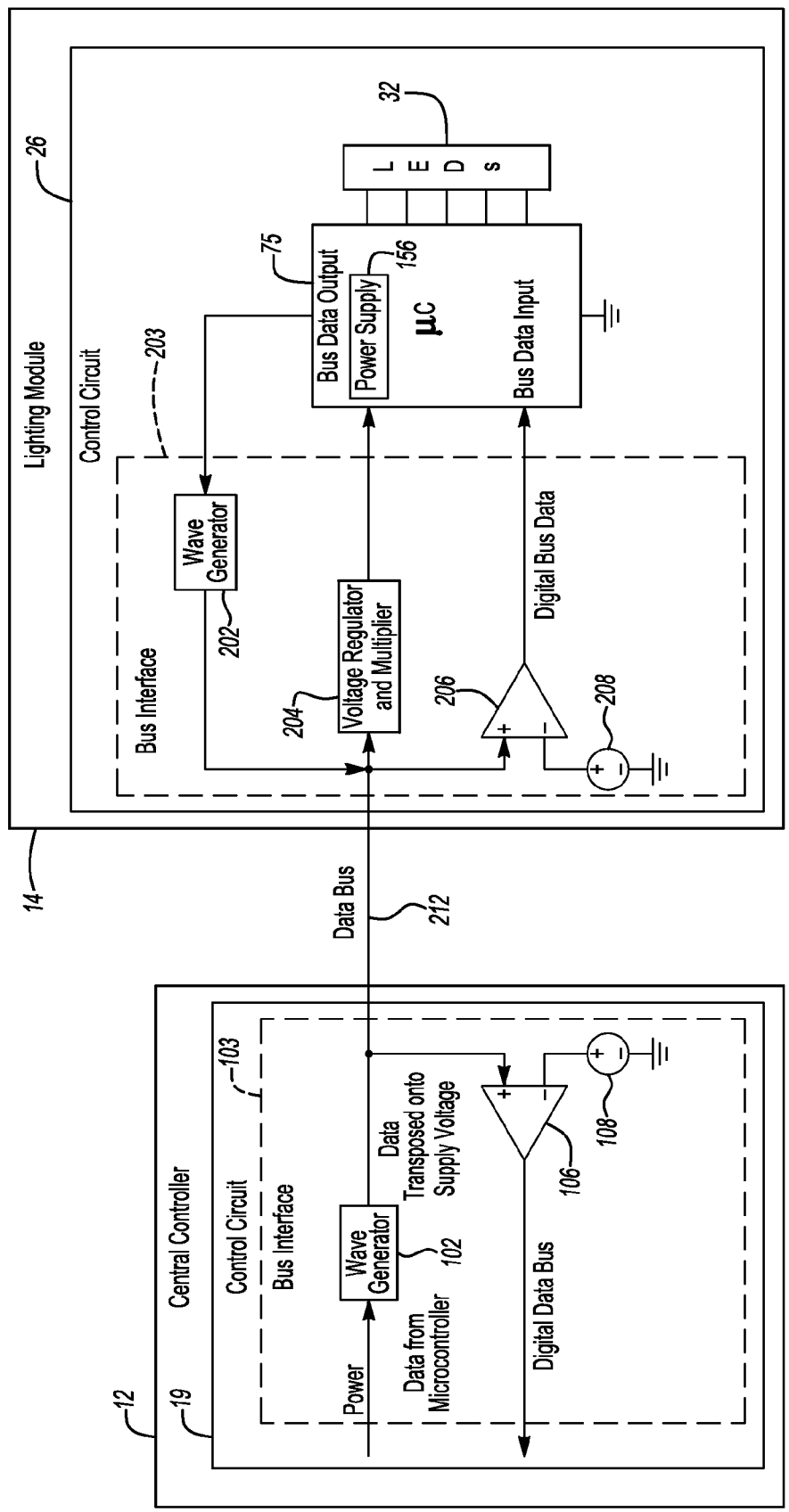
FIG. 4 depicts a more detailed ambient lighting system of that shown in FIG. 2.

To reduce the occurrence of EMI caused by transposing the digital data on the high voltage signal, each bus interface 103, 105, 107, 203, 205, and 207 may include additional circuitry as depicted in FIG. 4. For example, each bus interface 103, 105, and 107 in the central controller 12 may include a wave generator 102, a comparator 106, and a power supply 108. In addition, the bus interfaces 203, 205, and 207 in the lighting modules 14, 16, 18, respectively, may each include a wave generator 202, a voltage regulator (and multiplier) 204, a comparator 206, and a power supply 208.

The circuitry in FIG. 4 enables a bi-directional bus implementation in which the central controller 12 is capable of transmitting the lighting control signals to the lighting modules 14, 16, 18 and the lighting modules 14, 16, 18 are capable of transmitting lighting status signals (e.g., digital data and high voltage) over the single wire bus back to the central controller 12. The operations of transmitting the lighting control signal and lighting status signals will be described directly below in reference to the central controller 12 and the lighting module 14 (e.g., 14a-14n). It is generally understood, however, that any operations performed between the central controller 12 and the lighting module 14 may also apply between the central controller 12 and the lighting module 16 (e.g., 16a-16n); and the central controller 12 and the lighting module 18 (e.g., 18a-18n).

In operation, a microcontroller (or other suitable circuit) within the control circuit 19 transmits digital data to the wave generator 102. The wave generator 102 transposes digital data onto the high voltage signal to generate the lighting control signal. In such a case, the lighting control signal generated by each bus interface 103 includes the high voltage signal and digital data. The bus interface 103 transmits the lighting control signals to the bus interface 203 over the single wire data communication bus 212.

The voltage regulator 204 is configured to remove data from the lighting control signal and to allow the high voltage signal to pass to the power supply 156 for powering the power supply 156. In one example, the voltage regulator 204 may be implemented as a peak clipper and provide a constant voltage to the control circuit 26. The voltage regulator 204 may assist in enabling the bus interface 203 to provide high current loads while minimizing EMI by maintaining a low di/dt. The voltage regulator 204 may include a multiplier for boosting the voltage in the event the voltage received in the lighting control signal is below a predetermined threshold. Such a condition may ensure that the power supply 156 receives adequate voltage in moments in which bus voltage is low.

The comparator 206 reads the digital data from the lighting control signal and compares such data to a reference voltage provided by the power supply 208 to decode the digital data. If the digital data is greater than the reference voltage, then the comparator 206 outputs logic "1". If the digital data is less than the reference voltage, then the comparator 206 outputs logic "0". The output of the comparator 206 is fed to a bus data input of a microprocessor 75 (or other suitable circuit) in the control circuit 26. While not noted above in reference to the control circuits 28 and 30, it is recognized that such control circuits 28 and 30 may also include a microcontroller (or other suitable circuit) for receiving an output from the comparator. The control circuit 26 outputs a corresponding PWM (or controlled current) signal based on the output of the comparator 206 to drive the LED arrangement 32 to achieve the particular type of color and intensity desired by the user.

To transmit the lighting status signal from the lighting modules 14 to the central controller 12, the wave generator 202 receives the digital data from a bus data output of the microprocessor 75 and transposes such data onto the high voltage signal to generate the lighting status signal. In general, when the central controller 19 is not sending data on the bus 212, the central controller maintains the bus voltage to a level that is substantially similar to the high voltage signal to continuously power the lighting module 14. As such, for the lighting module 14 to put data on the bus 212, the data from the bus interface 203 is also transposed on the high voltage signal provided by the bus interface 103. The digital data in this case may include diagnostic information (or other suitable information) corresponding to, but not limited to, the status of the LEDs 34 (e.g., burned out, etc.) or wiring faults that may be preset for points in the circuit between the central controller 12, the lighting module 14, and the LEDs 34. The bus interface 203 transmits the lighting status signal to the bus interface 103 over the single wire data communication bus 212. The comparator 106 reads the digital data from the lighting status signal and compares such data to a reference voltage provided by the power supply 108. If the digital data is greater than the reference voltage, then the comparator 106 outputs logic "1". If the digital data is less than the reference voltage, then the comparator 106 outputs logic "0". The output is fed to an input of the microprocessor (or other suitable circuit) where the digital data can be processed to flag lighting module or wiring faults in the system.

While embodiments of the present invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. An ambient lighting system comprising:
   a lighting module configured to drive a light emitting device (LED) arrangement to display a desired ambient color in response to a lighting control signal and to transmit a lighting status signal providing diagnostic information for at least one of the lighting module and the LED arrangement;
   a controller configured to:
   transmit the lighting control signal including first digital data indicative of the desired ambient color and a feed signal for powering the lighting module on a bi-directional data communication bus between the controller and the lighting module; and
   receive the lighting status signal on the bi-directional data communication bus;
   wherein the lighting module comprises a comparator configured to receive the first digital data and to compare the first digital data to a predetermined voltage reference to decode the first digital data.

2. The system of claim 1 wherein the bi-directional data communication bus is comprised of a single wire.

3. The system of claim 1 wherein the lighting status signal includes second digital data indicative of the diagnostic information.

4. The system of claim 3 wherein the controller comprises a comparator configured to receive the second digital data and to compare the second digital data to a predetermined voltage reference to decode the second digital data.

5. The system of claim 1 wherein the feed signal provides a voltage of between 5 and 16 volts.

6. A device in a vehicle ambient lighting system that includes a controller configured to transmit lighting control signal including first digital data indicative of a desired ambient color and a feed signal for powering the lighting module and to receive a lighting status signal, the device comprising:
a lighting module configured to:
drive a light emitting device (LED) arrangement to display the desired ambient color in response to receiving the lighting control signal on a single wire data communication bus from the central controller; and
transmit a lighting status signal providing diagnostic information for at least one of the lighting module and the LED arrangement on the single wire data communication bus to the central controller;
wherein the lighting module comprises a comparator configured to receive the first digital data and to compare the first digital data to a predetermined voltage reference to decode the first digital data.

7. The device of claim 6 wherein the lighting module comprises a voltage regulator configured to separate the feed signal from the first digital data on the lighting control signal and to provide a substantially constant voltage with the feed signal such that the lighting module is powered therefrom.

8. The device of claim 6 wherein the feed signal provides a voltage of between 5 and 16 volts.

9. The device of claim 6 wherein the lighting status signal includes second digital data indicative of the diagnostic information.

10. The device of claim 9 wherein the controller comprises a comparator configured to receive the second digital data and to compare the second digital data to a predetermined voltage reference to decode the second digital data.

11. An ambient lighting device in a vehicle system that includes a controller configured to transmit a lighting control signal including first digital data indicative of a desired ambient color selected by a user, the device comprising:
a lighting module configured to drive a light emitting device (LED) arrangement to display the desired ambient color in response to receiving the lighting control signal on a single wire data communication bus from the central controller;
the lighting module comprising:
a voltage regulator configured to separate a feed signal from the first digital data on the lighting control signal such that the lighting module is powered from the feed signal; and
a comparator configured to receive the first digital data and to compare the first digital data to a predetermined voltage reference to decode the first digital data.

12. The device of claim 11 wherein the lighting module is further configured to transmit a lighting status signal indicative of diagnostic information for at least one of the lighting module and the LED arrangement.

13. The device of claim 12 wherein the lighting module is further configured to transmit the lighting status signal on the single wire data communication bus to the central controller.

14. The device of claim 12 wherein the lighting status signal comprises second digital data indicative of the diagnostic information.

15. The device of claim 14 wherein the central controller comprises a comparator configured to receive the second digital data and to compare the second digital data to a predetermined voltage reference to decode the second digital data.

* * * * *